United States Patent [19]

Rucker

[11] Patent Number: 4,544,077
[45] Date of Patent: Oct. 1, 1985

[54] LIQUID CONTAINER

[76] Inventor: Hal Rucker, 1103 Woodland Ave., Menlo Park, Calif. 94025

[21] Appl. No.: 682,399

[22] Filed: Dec. 17, 1984

[51] Int. Cl.$^4$ .............................................. B62J 11/00
[52] U.S. Cl. .................................. 220/449; 215/12 R; 150/52 R; 224/30 A; 224/39
[58] Field of Search ...................... 220/449; 150/52 R; 215/12 R; 224/30 A, 31, 35, 39, 148

[56] References Cited

U.S. PATENT DOCUMENTS

| | | | |
|---|---|---|---|
| 4,176,770 | 12/1979 | Griggs et al. | 224/30 A |
| 4,293,015 | 10/1981 | McGough | 215/12 R X |
| 4,345,704 | 8/1982 | Boughton | 224/39 |
| 4,386,721 | 6/1983 | Shimano | 224/39 |
| 4,478,265 | 10/1984 | DeMarco | 150/52 R |

*Primary Examiner*—Steven M. Pollard
*Attorney, Agent, or Firm*—Townsend and Townsend

[57] ABSTRACT

A liquid container having a container body provided with an open top. A slot extends through the side wall of the container body, and a liner of liquid absorbing material surrounds the outer surface of the container body and covers the slot. A top cover is removably mounted on the container body in covering relationship to the open top thereof, the top cover having a liquid outlet which the liquid in the container can be removed therefrom. The top cover has a leg depending therefrom and movable into and out of closing relationship to the slot so that liquid from the container body can be adjustably allowed to pass through the slot from the container body and into contact with the inner surface of the liner. When the ambient air and the container move relative to each other, evaporative cooling occurs which causes the liquid in the container body to be cooled.

11 Claims, 5 Drawing Figures

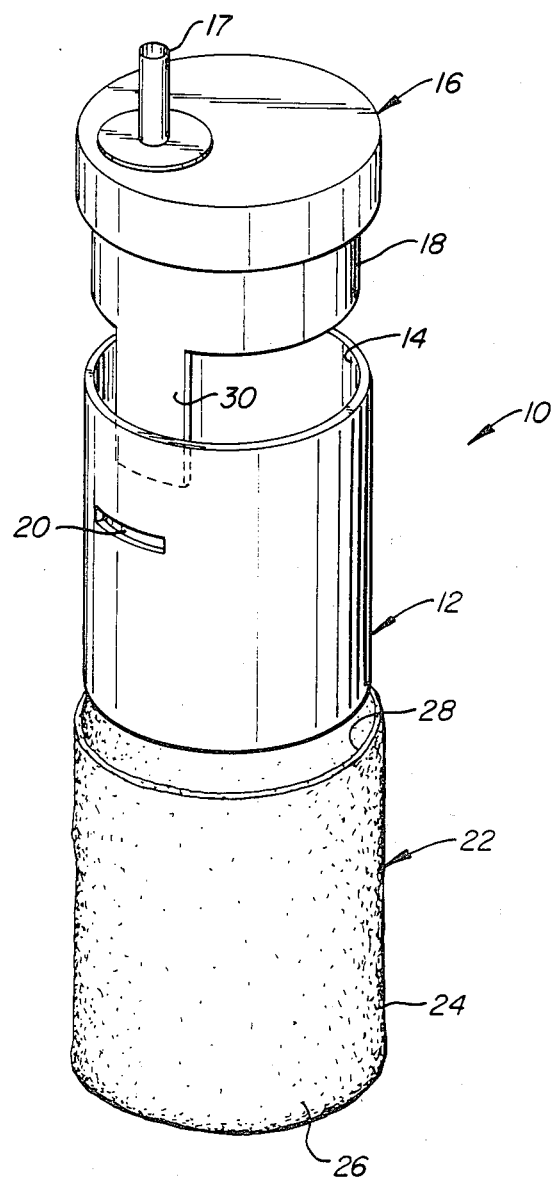
FIG._1.

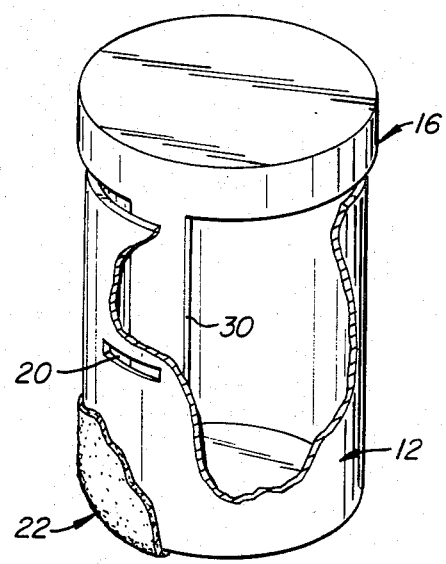
FIG._2.
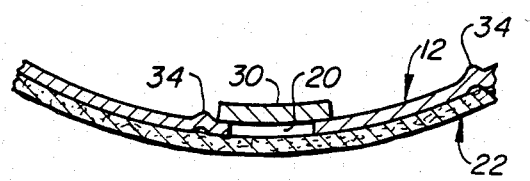
FIG._3.
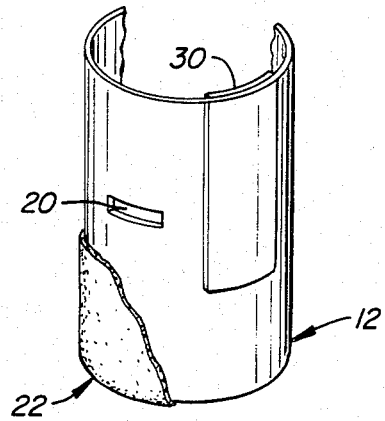
FIG._4.
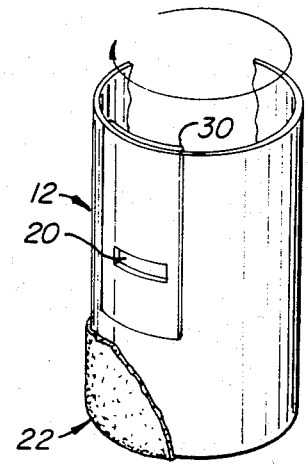
FIG._5.

LIQUID CONTAINER

This invention relates to improvements in liquid holders, especially those of the type removably mounted on a vehicle, such as on a bicycle frame for use by a bicyclist as the bicycle is moving.

BACKGROUND OF THE INVENTION

Bicyclists who are competing in races or traveling over long distances generally carry a water bottle removably attached by brackets or clamps to the bicycle frame. The bottle can be released and held in one hand to allow drinking of the water therefrom as the bicyclist continues to pedal the bicycle forwardly. This avoids the need for frequent stops yet the bicyclist can obtain the benefits of a drink whenever the need arises.

Generally, water bottles of the type described are made of a flexible plastic material so that the bottle can be squeezed to facilitate drinking of the water therefrom. The plastic of the bottle is, to some degree, heat conductive so that the temperature of the water in the bottle eventually will increase. Thus, the water in the bottle will become less refreshing to the bicyclist when the water is drunk. It is desirable, therefore, to keep the water temperature in the water bottle sufficiently low without having to pre-cool the water or add ice to it. Since conventional water bottles are not able to cool the water sufficiently to achieve this aim, a need exists for an improved liquid container which keeps a liquid in the container sufficiently cool so as to make it more drinkable. The present invention satisfies this need.

SUMMARY OF THE INVENTION

The present invention is directed to an improved liquid container which includes a container body of heat conductive material having a rotatable top provided with a stopper or other closure means permitting the liquid therein to be drunk from the container. The container has a liquid absorbing liner on the outer surface thereof and an improved valve responsive to the rotation of the top to allow liquid to flow from within the container and onto the inner surface of the liner so that the liquid will become absorbed by the liner. Thus, when air passes along the liner as the liquid container is on the bicycle frame, for instance, and the bicycle is moving, evaporation of the water in the liner occurs and this evaporation cools the water in the container. The valve can be adjusted from a fully open position to a fully closed position and can be placed in any operative position therebetween; thus, liquid can continuously seep out of the container and into the liner from whence it is evaporated as air passes relative to and along the liner.

The improved valve of the present invention includes a rigid leg carried by the top and extending into the container near the inner surface thereof. The container side wall has an orifice or slot, and the leg is rotatable into and out of closing relationship to the slot as the top rotates on the container. The liner overlies the slot so that liquid can flow out of the container through the slot and into the liner where it is absorbed. A suitable material for the liner is a chamois material so that when one portion of such material receives liquid, the liquid migrates to all portions of the material, thereby making the evaporation process more efficient in cooling the liquid in the container.

The primary object of the present invention is to provide an improved liquid container having a number of different uses, such as use as a water bottle removably attachable to the frame of a bicycle, wherein the container has an outer, liquid absorbing liner surrounding the heat conductive side wall of the container so that, when the liner becomes wet and the container moves relative to the air, evaporation of the liquid in the liner occurs which cools the liquid in the container to make it a more refreshing drink.

Another object of the present invention is to provide an improved liquid container of the type described wherein the container itself has an orifice in the side wall thereof which is open and closed by adjusting the operative position of the top of the container so that liquid can flow out of the container and into contact with the liner continuously or periodically so as to keep the liner wet without depleting the supply of liquid in the container itself.

Other objects of this invention will become apparent as the following specification progresses, reference being had to the accompanying drawings for an illustration of the invention.

IN THE DRAWINGS:

FIG. 1 is an exploded view of the improved liquid container of the present invention;

FIG. 2 is a perspective view, broken away and in section, to illustrate and showing the improved valve thereon for keeping the liner of the container in a wet condition;

FIG. 3 is an enlarged, fragmentary cross-sectional view of the valve and liner and showing the way in which the valve member is in a closed position;

FIG. 4 is a view similar to FIG. 2 but showing the valve fully opened; and

FIG. 5 is a view similar to FIG. 4 but showing the valve fully closed.

The liquid container of the present invention is broadly denoted by the numeral 10 and includes a container body 12 of heat conductive material, such as aluminum. The body is shown, for purposes of illustration, as being cylindrical; however, it could be of other shapes if desired. The body has a bottom (not shown) and an open top 14 and is adapted to be closed by a top cover 16 which has a flange 18 which is adapted to be press-fitted into container body 12 and to rotate relative thereto once the flange is in place in frictional engagement with the inner surface of body 12. The container typically is adapted to contain drinkable water; however, it can contain another type of liquid, such as fruit juice, if desired. The container body has a drinking or outlet spout 17 which is typically valved and conventional in design to allow drinking of the liquid in the container when the spout is placed in the mouth and the container body is tilted or squeezed.

Container body 12 has an orifice in the form of a circumferentially extending slot 20 therethrough, and this slot is in a position to allow liquid to pass out of the container and to the region exteriorly of the container body to cause the wetting of a liquid absorbing liner 22 which is mounted over container body 12.

Liner 22 can be of any suitable liquid absorbing material. A material especially suitable for this purpose is a chamois material.

The liner includes a side wall 24 and a bottom 26, the liner 22 having an open top 28 which receives container body 12. Generally, liner 22 would be of the same shape as but only slightly larger than container body 12 so that the container body will fit snugly within the liner and the liner will overlie slot 20 as shown in FIG. 3. As liquid seeps through slot 20 from within container body 12, the water contacts the inner surface of liner 22 and migrates to all portions of the liner, thereby wetting the liner and causing the liquid to seep completely through to the exterior surface of the liner.

Flange 18 has a leg 30 depending therefrom, the leg having an outer surface complemental to the inner surface of container body 12. Thus, if the side wall of container body 12 is generally cylindrical, leg 30 will have a generally convex outer surface which mates with and is slidable along the inner surface of the container body 12.

Leg 30 is adapted to open and close slot 20 and to adjustably allow liquid to pass through the slot and into engagement with the liner 22 when the liner is on the container body 12 as shown in FIG. 2. FIG. 2 further shows the leg partially across slot 20; thus, a limited amount of liquid can seep through the slot and into engagement with the liner.

FIG. 4 is a view similar to FIG. 2 and shows the leg 30 spaced from the slot so that the slot is fully open to allow the maximum amount of liquid to flow from the container body, through the slot and into contact with liner 22. FIG. 5 shows the slot fully closed so that no liquid can seep through the slot and into contact with the liner 22.

While a single slot and leg have been shown and described, it is possible to provide more than one slot and one leg. If a second slot is used, it can be at any suitable location, such as a location diametrically opposed to the first slot. The corresponding second leg would then be diametrically opposed to the first leg.

To assure that the leg 30 is fully closed or fully open, a pair of stops 34 are mounted on the inner surface of container body 12 on opposite sides of the slot 20 so that the stops retain leg 30 in the position shown in FIG. 3, closing slot 20. These stops can be formed in any suitable manner. For purposes of illustration, they are formed by indenting the side wall of container body 12 so that dimples are formed which define projections on the inner surface and indentations on the outer surface of the container body. Other stop means may be provided, if desired. Such stop means could be between flange 18 and the inner surface of container body 12 at a location remote from slot 20, if desired.

In use, liner 22 is mounted on container body 12 and liquid is put into the container, following which top cover 16 is put into place and the liquid can then be drunk from the container through the drinking spout 17 thereon. The filled container then can be put into an operative position where it is to be contacted by relative air. For instance, the liquid container can be placed on the frame of a bicycle using a suitable clamp so that, when the bicycle is moving, air passes over the container and in contact with liner 22.

To wet the liner, the valve defined by leg 30 is opened, causing liquid to flow through slot 20 and into contact with the inner surface of liner 22. The liquid will migrate generally to various interior portions of the liner, which portions are remote from slot 20, and, since the liner is of liquid absorbing material, the liquid will pass through the liner and wet the outer surface thereof. As the air and liner move relative to each other, evaporation occurs, causing a cooling effect which cools the liquid in the container body 12 by virtue of the thermal interchange relationship between container body 12 and liner 22.

The valve 30 can be opened to allow a certain amount of liquid to pass out of the container body 12 through slot 20; then, the valve can be closed. In the alternative, the leg can be kept in a position in which the slot 20 is partially or fully open so that the water will continuously wet the liner.

The present invention provides a liquid container having its own cooling system, thereby avoiding the need for externally applied cooling means. As a result, liquid container 10 is simple and rugged in construction, is inexpensive to manufacture and is capable of being made in any size so as to be suitable for a wide variety of different applications.

I claim:

1. A liquid container comprising:
   a container body of heat conductive material and having an open top;
   a top cover shiftably mounted on and closing the open top of the container body, said top cover having outlet means for allowing a liquid to be directed out of the container body;
   a liquid absorbing liner surrounding the container body and in thermal interchange relationship thereto; and
   valve means coupled with said container body for allowing liquid from the container body to contact the liner so that, when ambient air and the liner move relative to each other, an evaporative cooling effect occurs to cool the liquid in the container body.

2. A liquid container as set forth in claim 1, wherein the valve operates as a function of the movement of the top cover relative to the container body.

3. A liquid container as set forth in claim 1, wherein the container body has an orifice therethrough, said top cover having a leg movable into and out of closing relationship to the orifice as a function of the movement of the top cover relative to the container body.

4. A liquid container as set forth in claim 3, wherein the top cover has a flange in frictional, slidable engagement with the inner surface of the container body, the leg being secured to and extending from said flange.

5. A liquid container as set forth in claim 3, wherein the orifice is an elongated slot, said leg being movable longitudinally of the slot to adjustably open and close the slot.

6. A liquid container as set forth in claim 5, wherein the container body is generally cylindrical, said slot extending circumferentially of the central axis of the container body.

7. A liquid container as set forth in claim 5, wherein is included a stop means for releasably holding the leg in a predetermined position relative to the slot.

8. A liquid container as set forth in claim 7, wherein said stop means includes a pair of projections on the inner surface of the container body on opposite sides of the slot.

9. A liquid container as set forth in claim 7, wherein the inner surface of the container body is cylindrical, said leg having a convex outer surface substantially complemental to the inner surface of the container body.

10. A liquid container as set forth in claim 1, wherein said liner is formed from a chamois material.

11. A liquid container as set forth in claim 1, wherein said container body is generally cylindrical, said liner being cylindrical and complemental to the container body so as to receive the container body therein.

* * * * *